No. 856,486. PATENTED JUNE 11, 1907.
F. J. NEWMAN.
DRIVING MECHANISM FOR AUTOMOBILES.
APPLICATION FILED JAN. 9, 1905.

2 SHEETS—SHEET 2.

Witnesses,

Inventor,
Frederick J. Newman,
By Offield Towle Linthicum
Attys.

UNITED STATES PATENT OFFICE.

FREDERICK J. NEWMAN, OF CHICAGO, ILLINOIS, ASSIGNOR TO WOODS MOTOR VEHICLE COMPANY, OF CHICAGO, ILLINOIS, A CORPORATION OF ILLINOIS.

DRIVING MECHANISM FOR AUTOMOBILES.

No. 856,486.  Specification of Letters Patent.  Patented June 11, 1907.

Application filed January 9, 1905. Serial No. 240,302.

*To all whom it may concern:*

Be it known that I, FREDERICK J. NEWMAN, a citizen of the United States, residing in Chicago, in the county of Cook and State of Illinois, have invented certain new and useful Improvements in Driving Mechanisms for Automobiles, of which the following is a specification.

This invention relates to improvements in driving mechanisms for automobiles and refers more specifically to improvements in the driving train connecting the driven wheels of a vehicle with the prime mover or motor.

The salient object of the invention is to provide a construction in which the motor may be mounted upon a spring supported vehicle body and operatively connected with the traction wheels in such manner that vertical displacement of the motor relatively to the driven traction member or members does not result in disarranging the proper driving connections between the motor and driven member or members.

Subsidiary objects of the invention are to so mount an intermediate element of the driving train that it will automatically adjust itself to maintain the proper relation of all of the elements of the train during the movement of the motor relatively to the ultimate driven traction member; to provide a construction and arrangement of parts which avoids the bringing of torsional or cramping stresses upon any part of the driving train, thereby securing the maximum efficiency of the motor effort; to provide a construction in which a counter shaft forming an intermediate member of the driving train is suspended by means of planet links concentrically with the axis of the motor and is by means of a distance rod or rods maintained in accurately proper relation to the driven vehicle wheel; to provide a simple and practical construction which is capable of being readily adjusted and is particularly adapted to driving traction wheels singly or independently of each other, and in general to provide a simple and improved construction and arrangement of the character referred to.

Figure 1:
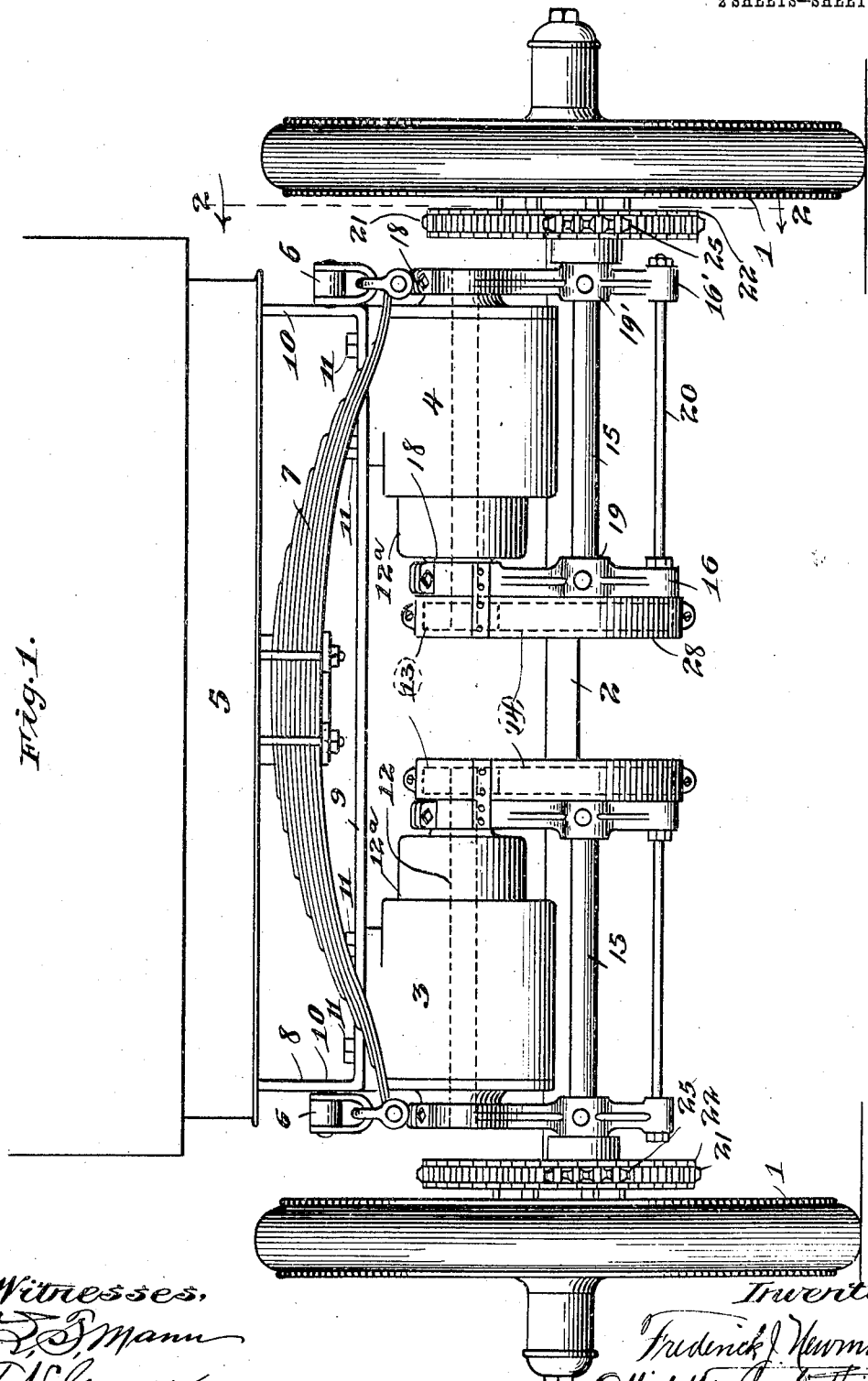
Figure 2:
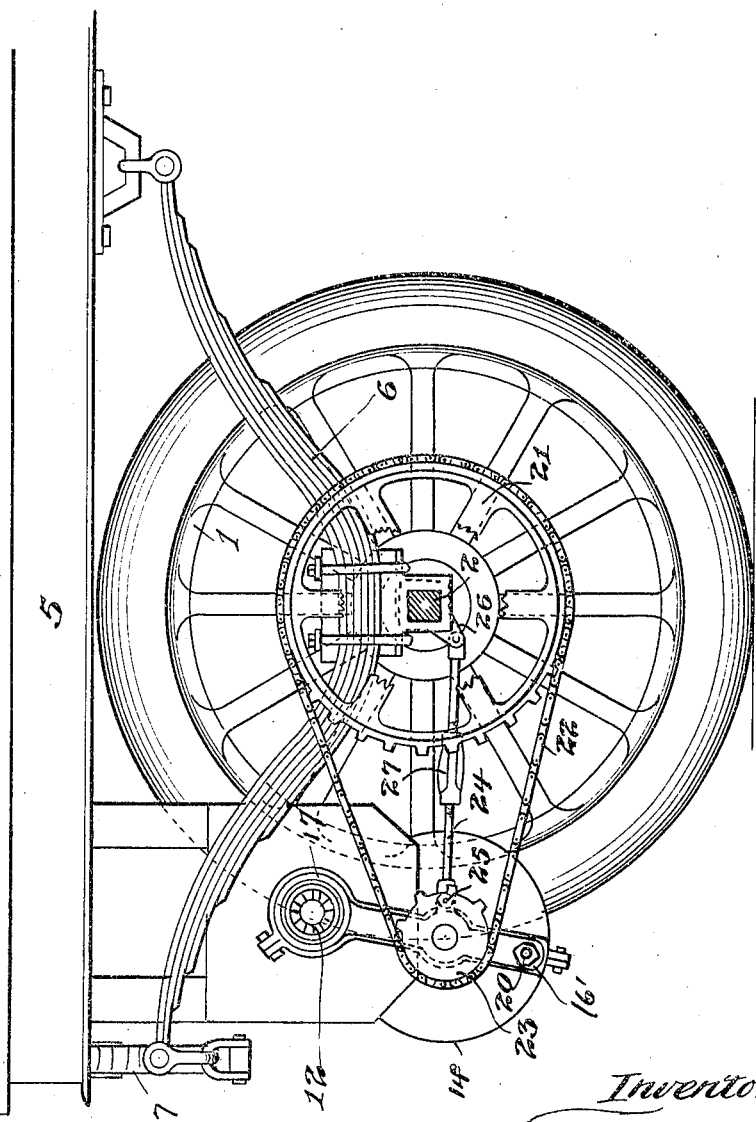

The invention will be readily understood from the following description, reference being had to the accompanying drawings, in which Figure 1 is a rear end elevation of a vehicle equipped with a preferred embodiment of the invention; Fig. 2 is a transverse sectional view taken approximately on line 2—2 of Fig. 1 and looking in the direction of the arrows.

In the embodiment illustrated two traction wheels, designated 1 1, are mounted to rotate independently upon a main axle 2, and separate motors 3 and 4 respectively are arranged to drive the respective wheels; the motors being mounted upon or suspended from the vehicle body, designated as a whole 5, and the latter being spring supported from the running gear as usual. The particular construction and arrangement of the springs, by means of which the vehicle body is supported from the running gear, form no part of the present invention, but it is sufficient to say that these springs are, as usual, so arranged that the up and down movement of the vehicle body relatively to the axle is confined to movement in vertical planes, or substantially so. In the instance illustrated a set of longitudinally disposed side springs 6 and a single transverse spring 7 connected with the rear ends of the side springs form the spring support for the rear end of the vehicle body.

Upon the bottom of the vehicle body is secured a suspension frame 8 comprising a transverse bar-like member 9 and integral end hanger portions 10. The motor casings of the motors 3 and 4 are rigidly bolted to the bar 9, as indicated at 11, with the axes of their main shafts 12 parallel with the main axle 2 of the vehicle. The motors 3 and 4 are electric motors in the present embodiment, and their armature shafts constitute their main drive shafts; the ends of said armature shafts being journaled in the ends of the outer motor casing 12$^a$, as usual. The armature shaft of each motor is at one end extended beyond the main casing 12$^a$ and provided with a rigid driving pinion 13 which intermeshes with a spur gear 14 mounted upon a counter shaft 15 arranged below the motor.

In order to support the counter shaft 15 in parallel relation to the armature shaft and movably, so that it may maintain a definite relation to the main axle of the vehicle, I provide a pair of planet links 16 16' the upper ends of which are pivotally supported upon hub-like extensions 17 18 of the motor frame, which extensions are concentric with the main armature shaft. The planet links 16' are provided with suitable journal bearings 19 19' for the counter shaft 15 and are also extended beyond said journal bearings and desirably connected by means of a stay rod 20 whereby they are maintained at a definite distance apart at their outer ends.

Upon each traction wheel, and concentrically with its axis of rotation, is rigidly secured a sprocket-wheel 21, and these sprocket-wheels 21 are operatively connected with the counter shafts 15 of the respective motors by means of chain belts 22 connecting the gears 21 with smaller sprocket gears 23 rigidly mounted upon the respective counter shafts 15 in plane alinement with the gears 21.

In order to maintain the counter shaft in proper relation to the gears 21, regardless of the rising and falling movements of the motors, distance-rods 24 are arranged to connect the planet links with the axle 2 of the vehicle; these distance-rods being arranged to extend in an approximately direct line between the centers of the gears 21 and 23. In the particular instance illustrated each link is provided with an ear or connection-lug 25 with which one end of the distance-rod is pivotally connected, and upon the axle is mounted a bracket 26, to which the opposite ends of the distance-rod is similarly connected. In order to provide for adjustment of the lengths of the distance-rods each is provided intermediate its length with a turn-buckle 27.

The two gears 13 and 14 of each motor are shown as inclosed within a suitable housing 28; it being understood that these housings are mounted so as to be capable of planet movement with the counter shaft and planet links, although it will be obvious that said housings may be made large enough to accommodate the relative movements of the gears therein, in which case the housings may be rigidly mounted.

The operation of the mechanism constructed and arranged as described will be entirely obvious from the foregoing description. It may be noted, however, that any bodily rising or falling movement of the motors with the vehicle body due to compression or expansion of the springs will be accompanied by a slight angular change of the planet links around the armature shafts; the counter shafts in such rising and falling movements being compelled to move in an arc concentric with the main axle 2 or axes of the gears 21. This, of course, maintains the driving belts at their regular adjusted tension and avoids the bringing of torsional stresses upon the driving train there by securing the maximum efficiency from the motors.

While I have herein shown and described a preferred and practical embodiment of the invention, yet it will be obvious that the details of construction and arrangement may be modified without departing from the invention and I do not therefore limit myself to such details, except to the extent that they are made the subject of specific claims.

I claim as my invention:

1. A driving mechanism for automobiles comprising a vehicle running gear provided with a main axle, a traction wheel mounted upon said axle, a spring-supported vehicle body carried by the running gear, a motor carried by said vehicle body at a point longitudinally removed from the axle, a driving shaft directly driven by said motor and mounted upon the vehicle body to extend parallel with the axis of rotation of the traction wheel, a pair of planet links journaled concentrically with said driving shaft and located at separated points longitudinally of the driving shaft, a shaft journaled intermediate the free ends of said links and arranged parallel with the axis of the driving shaft, a stay rod connecting the free ends of said links, a transmission element mounted upon the shaft carried by the links, driving connections between said transmission element and driving shaft, a driving element rigidly mounted concentrically upon the traction wheel, driving connections between said latter element and the transmission element, and a distance member connected with the link construction and with the vehicle axle, substantially as described.

2. A driving mechanism for automobiles comprising a vehicle running gear provided with a main axle, a traction wheel mounted upon said axle, a spring-supported vehicle body carried by the running gear, a motor carried by said vehicle body at a point longitudinally removed from the axle, a driving shaft directly driven by said motor and mounted upon the vehicle body to extend parallel with the axis of rotation of the traction wheel, a pair of planet links having extended ends journaled concentrically with said driving shaft and located at separated points longitudinally of the driving shaft, a shaft journaled substantially intermediate of said links and arranged parallel with the axis of the driving shaft, said links connected at their extended ends with a stay rod, a transmission element mounted upon the shaft carried by the links, driving connections between said transmission element and driving shaft, a driving element rigidly mounted concentrically upon the traction wheel, driving connections between said latter element and the transmission element, a distance member provided intermediate its length with a turn-buckle and connected with the link construction and with the vehicle axle, respectively, and a connection bar extending between the outer ends of said links and rigidly connecting the same, substantially as described.

3. A driving mechanism for automobiles, comprising a vehicle running gear provided with a main axle, traction wheels rotatably mounted on the ends of said axle, a spring-supported vehicle body carried by the running gear, a pair of independent motors carried by said vehicle body at points longitudinally removed from the axle, a pair of independent driving shafts directly driven by said motors, respectively, and mounted upon the vehicle body to extend parallel with the axis of rotation of the traction wheels, a pair of planet links pivotally mounted concentrically with each of said driving shafts, respectively, shafts carried by said links arranged parallel with the axis of the driving shafts, and journaled above the free ends thereof, stay rods connecting the free ends of said links, transmission elements mounted upon the shafts carried by the links, driving connections between the motors and said last-named shafts, driving elements rigidly mounted concentrically upon the traction wheels, driving connections between the latter and said transmission elements, and longitudinally adjustable distance members connected with said links and vehicle axle, substantially as described.

FREDERICK J. NEWMAN.

Witnesses:
FREDERICK C. GOODWIN,
JAMES R. OFFIELD.